(12) United States Patent
Cui

(10) Patent No.: US 8,798,873 B2
(45) Date of Patent: Aug. 5, 2014

(54) WIRELESS REMOTE CONTROL SYSTEM FOR VEHICLE POWER TAKE-OFF

(75) Inventor: John X. Cui, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1090 days.

(21) Appl. No.: 11/959,701

(22) Filed: Dec. 19, 2007

(65) Prior Publication Data

US 2009/0164074 A1 Jun. 25, 2009

(51) Int. Cl.
*G06F 17/00* (2006.01)

(52) U.S. Cl.
USPC ........... 701/50; 701/51; 701/22; 701/56; 701/58; 180/65.265; 180/65.25; 180/24.07; 180/333; 180/54.1

(58) Field of Classification Search
USPC ............. 701/2, 50, 51; 180/53.1, 53.4, 247
See application file for complete search history.

(56) References Cited

U.S. PATENT DOCUMENTS

| | | | | |
|---|---|---|---|---|
| 5,311,787 A * | 5/1994 | Wilson et al. | ................ | 74/15.88 |
| 6,619,257 B2 * | 9/2003 | Tarasinski | .................... | 123/350 |
| 7,451,028 B2 * | 11/2008 | Pillar et al. | ..................... | 701/50 |
| 7,707,810 B2 * | 5/2010 | Strosser et al. | ........... | 56/10.2 R |
| 2001/0036882 A1 * | 11/2001 | Hrazdera | ..................... | 477/166 |
| 2006/0271263 A1 * | 11/2006 | Self et al. | ....................... | 701/50 |
| 2007/0135257 A1 * | 6/2007 | Bissontz | ......................... | 477/5 |
| 2009/0164074 A1 * | 6/2009 | Cui | ................................. | 701/51 |
| 2009/0221399 A1 * | 9/2009 | Eriksson et al. | ............. | 477/115 |

OTHER PUBLICATIONS

Wireless Remote Control System. Products—Sea-Lift Model 45. KMI SEA-LIFT 2007, [retrieved on Nov. 15, 2007]. Retrieved from Internet: <URL: http://www.sea-lift.com/product_details.cfm?ID=5>.
Wireless Remote Control System. Welcome to KMI SEA-LIFT. KMI SEA-LIFT 2007, [retrieved on Nov. 15, 2007]. Retrieved from Internet: <URL: http://www.sea-lift.com/>.
Wireless Remote Control System. Photo & Media Gallery. KMI SEA-LIFT 2007, [retrieved on Nov. 15, 2007]. Retrieved from Internet: <URL: http://www.sea-lift.com/media.cfm?cid=14>.

* cited by examiner

*Primary Examiner* — Redhwan k Mawari
(74) *Attorney, Agent, or Firm* — Ingrassia Fisher & Lorenz, P.C.

(57) ABSTRACT

Methods and apparatus are provided for controlling a power take-off (PTO) of an engine equipped vehicle. Transceivers in a portable wireless remote control device (WRCD) and an in-vehicle control system (IVCS) wirelessly communicate (a) user generated PTO action requests to the vehicle, and (b) PTO and vehicle status information to the WRCD. A PTO control module (PTOCM) in the IVCS translates the wirelessly received user action requests into engine and PTO operating or action commands, monitors the engine and PTO status and has the IVCS transceiver send the status information back to the WRCD where it can be presented to the user on a display. In a preferred embodiment, maximum use is made of components already existing in the vehicle.

20 Claims, 5 Drawing Sheets

WIRELESS REMOTE CONTROL SYSTEM FOR VEHICLE POWER TAKE-OFF

TECHNICAL FIELD

The present invention generally relates to electronic systems for vehicles, and more particularly relates to means and methods for a wireless remote control system for a vehicle's power take-off.

BACKGROUND OF THE INVENTION

Many vehicles, especially heavy duty vehicles used in construction and maintenance, on farms, for municipal and utility services and the like, use power from the engine to drive auxiliary equipment mounted on the vehicles. Familiar non-limiting examples are truck mounted cement mixers that use engine power to drive the cement mixing barrel, dump trucks that use engine power to raise and lower the truck bed, mobile drilling rigs that use engine power to rotate and raise and lower the drill bit, lift bucket trucks that use engine power to raise and lower a manned (or un-manned) work bucket or stage for tree trimming, utility line service, sign installation and repair, bridge and building repair, and so forth. The equipment that transmits engine power to this special equipment is referred to as a "power take-off", abbreviated as "PTO". A power take-off command module (PTOCM) is provided in these vehicles to control the operation of the PTO by, for example, adjusting the engine speed and other functions. The PTOCM controls the engine speed (RPM) according to commands received from one or more power take-off controls (PTOCs). There are often two PTOCs: (i) an in-cab control device (ICCD), and (ii) a remote control device (RCD). The ICCD is usually mounted on the dashboard of the driver's cab of the vehicle and is used by the operator to control, for example, engine RPM and other functions when the vehicle is in motion or stopped on station (e.g., at the location where the auxiliary equipment is to be used). The RCD is installed outside the vehicle and has historically been connected to the PTOCM by a long electrical umbilical cord. An operator uses the RCD to control engine RPM and other functions from outside the vehicle while it is stopped on station. For example, an operator may stand in a lift bucket and operate the RCD to raise and lower the bucket, e.g., for tree trimming or sign installation or other purposes. In addition to controlling the engine RPM, the PTOCM and RCD connected thereto may include other control functions such as engine start/stop without resort to the in-cab ignition key, hydraulic pump start/stop, engage or disengage a clutch to the PTO, change direction of motion of the auxiliary equipment (e.g., raise or lower the bucket) and so forth. These illustrations of various RCD and PTOCM functions are intended merely as examples to facilitate understanding and not by way of limitation. Many other functions can be provided by the RCD and PTOCM. As used herein, the words "auxiliary equipment" are intended to include any kind of add-on equipment driven through a power take-off from the vehicle engine.

While such prior art wire umbilical coupled systems are useful, they also have limitations as a consequence of the RCD having to be tethered to PTOCM by an umbilical wire. Such an arrangement often limits the locations outside the cab where the operator can stand to view and operate the PTO. While this can be mitigated somewhat by providing a longer control umbilical, this increases the likelihood of the umbilical being damaged or rendered inoperable, especially at a bustling construction site where many other work activities may be occurring in close proximity to the vehicle. Accordingly, it is desirable to provide a wireless system for remote control of the PTO functions of a vehicle so that the RCD need not be coupled to the PTOCM via an umbilical cord. In addition, it is desirable to accomplish this using functions that may already exist within the vehicle for other purposes. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Methods and apparatus are provided for wirelessly controlling operation of a power take-off (PTO) system of an engine-equipped vehicle. The apparatus comprises, a portable remote control device wirelessly coupled to the vehicle and adapted to receive user PTO action request inputs, convert those action request inputs to signals understandable by the vehicle and wirelessly transmit the signals to the vehicle, and an in-vehicle control system wirelessly coupled to the portable remote control device and adapted to receive the signals from the remote control device, convert the signals to engine and PTO action commands corresponding to the user PTO action request inputs, transmit the action commands to the engine and PTO, and report engine and PTO status information back to the remote control device.

The method for operating a power take-off (PTO) system of an engine equipped vehicle, wherein a user has access to a control device for controlling the PTO system and the vehicle includes a control system for operating the PTO system, comprises, wirelessly receiving a user's action request from the control device, determining what engine and PTO system actuation commands are associated with the user's action request, transmitting the actuation commands to the engine and PTO system if the vehicle is stationary, and transmitting engine and PTO system status information to the control device.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
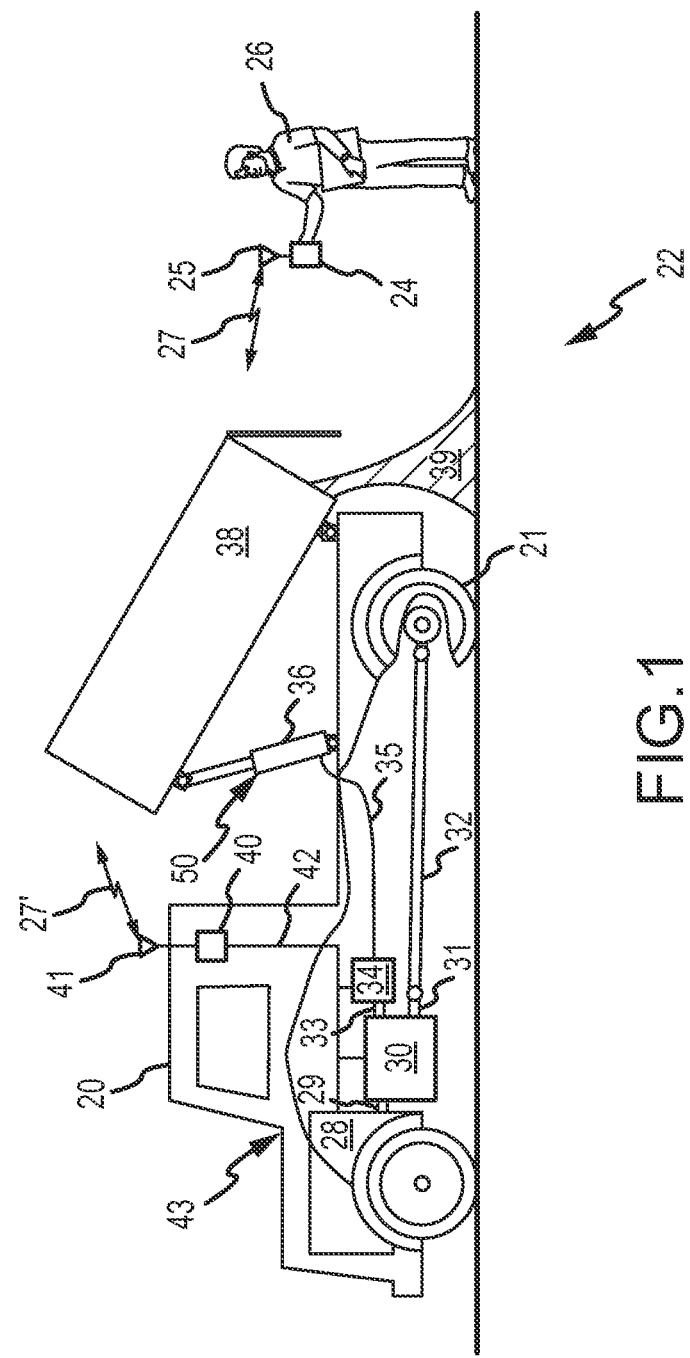
FIG. 1 is a simplified side and partial cut-away schematic drawing of an exemplary vehicle (e.g., a dump truck) with a power take-off being operated by a wireless remote control device (WRCD) according to an embodiment of the invention.

FIG. 1 is a simplified side and partial cut-away schematic drawing of exemplary vehicle 20 (e.g., a dump truck) with remote controlled power take-off system 22 being operated by wireless remote control device (WRCD) 24 held by user or operator 26, according to an embodiment of the invention. Exemplary vehicle 20 comprises engine 28 with power output 29 mechanically coupled to transmission 30. In this example, transmission 30 has first power output 31 coupled to drive shaft 32 leading to the differential associated with rear drive wheels 21. However, this is merely an example to facilitate understanding and not intended to be limiting. Transmission 30 has second power output 33 coupled to power take-off (PTO) device 34, in this illustration a hydraulic pump and associated valves, which transmit, for example, pressurized hydraulic fluid via line 35 to hydraulic piston 36 in response to action requests issued by WRCD 24. Piston 36 is adapted to raise and lower dump body 38 so that load 39 (e.g., gravel) is placed where desired by operator 26. Action requests entered by operator 26 into WRCD 24 are processed and wirelessly communicated via antenna 25 to in-vehicle control system (IVCS) 40 as shown by signal 27. Signal 27 is received by IVCS 40 via antenna 41. IVCS 40 is desirably coupled to engine 28, transmission 30 and PTO device 34 via in-vehicle communication network or bus 42, often referred to as control area network (abbreviated as "CAN") 42. IVCS 40 can wirelessly respond to WRCD 24 via antenna 41 as shown by signal 27' in order to provide operator 26 with information on the status of remote controlled power take-off system 22. This is desirable but not essential. IEEE Standard 802.11i is a non-limiting example of a suitable short distance communication signaling protocol for wireless signals 27, 27'. Persons of skill in the art will understand that a remote controlled power take-off system in a dump truck is presented in FIG. 1 merely by way of illustration and not intended to be limiting and that the remote controlled power take-off system of the present invention may be applied to any type of auxiliary equipment mounted on a vehicle, including but not limited to those types of auxiliary equipment noted in the Background section above. The short distance wireless communication capability and engine management capability provided by the elements shown in FIG. 2 may already exist in some form in many vehicles for other purposes. One of the features of the present invention is to take advantage of this existing in-vehicle capability by adapting it the needs of a wireless PTO control system so that a duplicate in-vehicle system need not be installed in connection with the wireless PTO control system.

Figure 2:
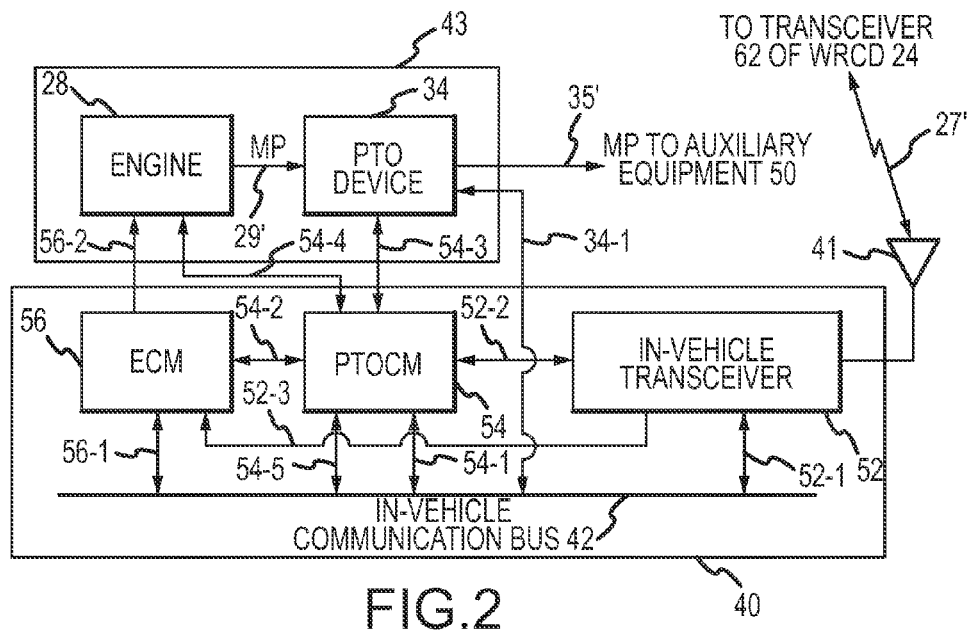
FIG. 2 is a simplified schematic block diagram of the in-vehicle portion of the PTO control system of FIG. 1 according to an embodiment of the invention and showing further detail.

FIG. 2 is a simplified schematic block diagram of IVCS 40 of wireless remote controlled PTO system 22 of FIG. 1 according to an embodiment of the invention and showing further detail. Associated mechanical drive portion 43 of vehicle 20 is also illustrated, but in this example, it is assumed that engine 28 is mechanically coupled directly via mechanical power (MP) shaft 29' to PTO device 34. PTO device 34 is coupled to whatever auxiliary equipment 50 is mounted on the vehicle via connection 35', which may be a moving mechanical shaft, a fluid (e.g., air or liquid) connection or any other means of transmitting power to auxiliary equipment 50, depending upon the needs of auxiliary equipment 50. In the example of FIG. 1, auxiliary equipment 50 is hydraulic piston 36 and connection 35' corresponds to hydraulic line 35 of FIG. 1, but this is only by way of example and not intended to be limiting.

IVCS 40 comprises in-vehicle transceiver 52 that sends and receives signals 27', 27 via antenna 41, and power take-off control module (PTOCM) 54 that directly or indirectly adjusts the speed of engine 28 and controls other PTO functions and engine control module (ECM) 56. Engine control module (ECM) 56 is desirably a conventional electronic apparatus for controlling and monitoring the operation of engine 28 and since it is now typically found in most vehicles, it is advantageously used in connection with IVCS 40 of remote control PTO system 22. In general, PTOCM 54 has the following functions: (1) monitor and process the PTO action request inputs from both the ICCD (or from a remote control device on an umbilical cord) and those received from the WRCD 24 via transceiver 52; (2) monitor and process the operation status of vehicle 20, engine 28, transmission 30, brakes, and PTO device 34; (3) check the conditions to execute the PTO commands by controlling engine operation; and (4) feed back vehicle and PTO operation status to the user interface of WRCD 24 via transceiver 52. In a preferred embodiment, PTOCM 54 sends commands to ECM 56 over bus 42 to control engine speed, but may also control engine speed directly. Transceiver 52 is preferably coupled to PTOCM 54 and ECM 56 via in-vehicle communication bus 42, as indicated by connections 52-1, 54-1, 54-5 and 56-1, running respectively from elements 52, 54, and 56 to bus 42. Alternatively, transceiver 52 may be coupled more directly to PTOCM 54 via connection 52-2 and to ECM 56 through connection 52-3 or through connection 52-4, 54-2 via PTOCM 54. Either arrangement is useful. ECM 56 is preferably coupled to engine 28 via leads or bus 56-2. If ECM 56 is not used, then PTOCM 54 may be coupled directly to engine 28 via leads or bus 54-4. Either arrangement is useful. PTO device 34 may also be coupled to in-vehicle communication bus 42 as shown by link or connection 34-1 and commands passed from PTOCM 54 to PTO device 34 via connection 54-5, bus 42 and connection 34-1. Either arrangement is useful. What is important is that: (i) the action requests issued by WRCD 24 be able to be converted to the appropriate commands and transmitted to engine 28 and optionally to PTO device 34 depending on its capabilities, so that the desired actions, as for example, start engine, stop engine, set engine RPM, actuate various elements (e.g., valves, clutches, gears, motors, relays, etc.) within PTO device 34 can be accomplished, depending upon the needs of auxiliary equipment 50 and the action requests received from WRCD 24, and that (ii) feedback on the current operating status of PTO device 34 and vehicle 20 can be obtained by PTOM 54 for transmission via transceiver 52 and antenna 41 back to WRCD 24. A Transmission control module (TCM), not shown, may also be coupled to bus 42 to allow transmission commands and status information to be sent and received, but this is not important to the present invention, since WRCD 24 is generally only used when the vehicle is stationary and transmission commands are not needed. However, the inclusion of transmission commands is not precluded.

Figure 3:
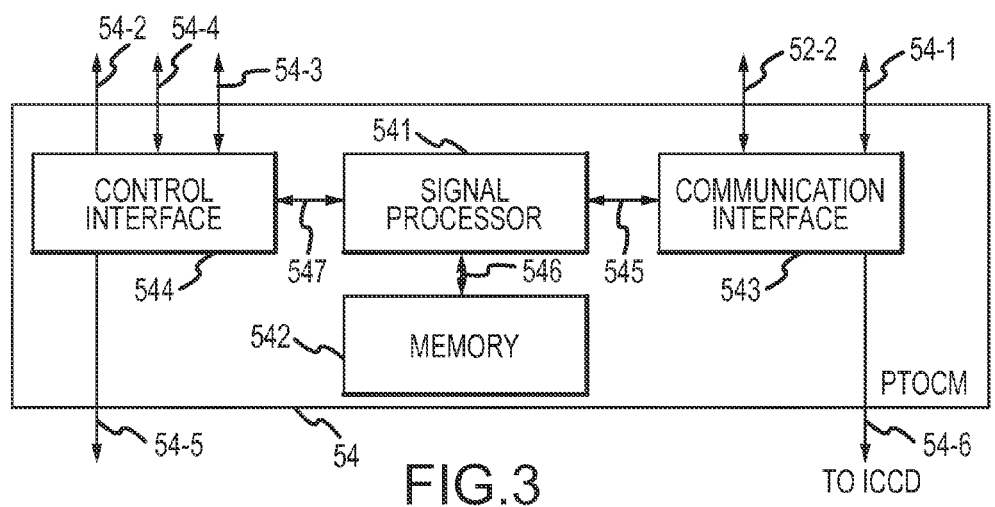
FIG. 3 is a simplified schematic block diagram of the PTO control module (PTOCM) illustrated in FIG. 2 showing further details.

FIG. 3 is a simplified schematic block diagram of PTO control module (PTOCM) 54 illustrated in FIG. 2 and showing further details. PTOCM 54 comprises communication interface 543, signal processor 541 coupled to communication interface 543 via bus or link 545, memory 542 coupled to signal processor 541 via bus or link 546, and control interface 544 coupled to signal processor 541 via bus or link 547. User action requests received through communication interface 543 are translated by processor 541 (e.g., using data and instructions stored in memory 542) into control signal commands that are sent via control interface 544 to various elements of IVCS 40, including PTO device 34, to carry out the user requested actions. Signal processor 541 also monitors the vehicle and PTO status via control interface 544 for retransmission via communication interface 543 back to the remote control device from which the action requests originated for presentation to the user thereof. Communication interface 543 is coupled to in-vehicle transceiver 52 either directly via connection 52-2 or by means of in-vehicle communication bus 42 as shown by connection 54-1, 52-1 (see FIG. 2). If the vehicle is equipped with an in-cab control deice (ICCD), this is also conveniently coupled to communication interface 543 as shown by bus or link 54-6 so that processor 541 can process action requests originating in the ICCD and send back status information thereto. According to various embodiments, control interface 544 is coupled to engine 28 either directly via link or bus 54-4 or indirectly via ECM 56 and links 54-5, bus 42, 56-1 and 56-2 so that engine operation can be regulated and monitored. Control interface 544 is also coupled to PTO device 34 via link or bus 54-3 or via link 54-5, bus 42 and link 34-1 so that valves, relays, clutches or other functions within PTO device 34 can be controlled and their status monitored.

Figure 4:
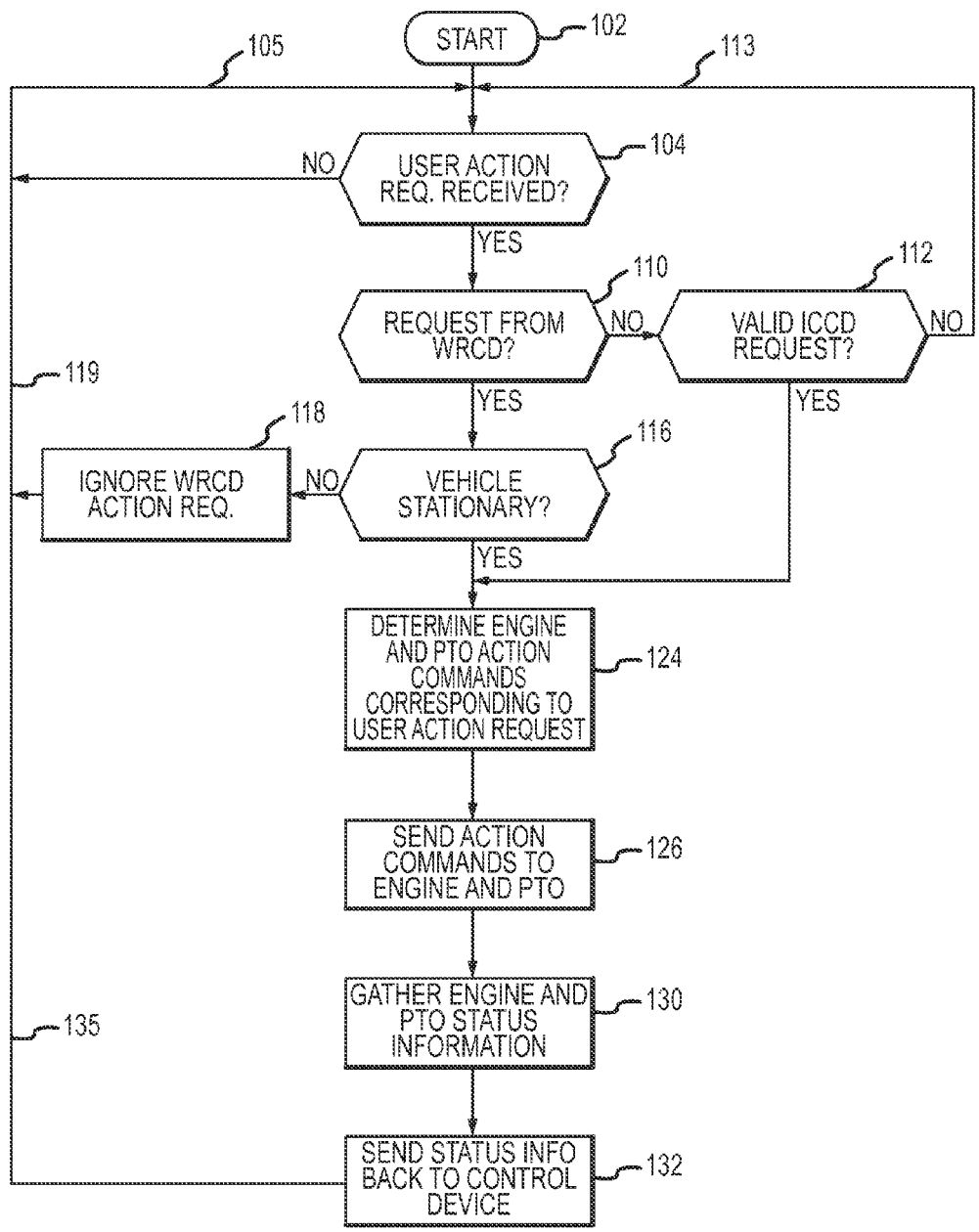
FIG. 4 is a simplified block diagram of method steps carried out by the PTOCM of FIG. 3.

FIG. 4 shows a simplified block diagram of method steps 100 carried out by processor 541 of PTOCM 54 of FIG. 3 in cooperation with communication interface 543, memory 542 and control interface 544. Method 100 begins with START 102, which can occur at system power-up, and initial USER ACTION REQUEST RECEIVED? query 104 wherein it is determined whether or not a request by a user for a particular PTO action (e.g., start, stop, raise dump bed, lower bucket, etc.) has been received from WRCD 24 or the ICCD. If the outcome of query 104 is NO, then method 100 returns to start 102 as shown by path 105 and awaits the arrival of a user action request via interface 543. If the outcome of query 104 is YES, then method 100 advances to REQUEST FROM WRCD? query 110, wherein it is determined whether or not the received request originated from WRCD 24. If the outcome of query 110 is NO, then method 100 advances to VALID ICCD REQUEST? query 112, wherein it is determined whether the request is among those allowed to be issued by the ICCD. If the outcome of query 112 is NO, then method 100 returns to START 102 and initial query 104, as shown by path 113.

Referring again to query 110, if the outcome of query 110 is YES, indicating that the action request originated from the WRCD, then method 100 advances to VEHICLE STATIONARY? query 116 wherein it is determined whether or not the vehicle is stationary, i.e., not moving. If the outcome of query 116 is NO indicating that the vehicle is moving, then method 100 advances to step 118 wherein the request originating from the WRCD is ignored and method 100 returns to START 102 and initial query 104 as shown bypath 119, 105.

When the outcome of either query 112 (for a request originating from the ICCD) or query 116 (for a request originating from the WRCD 24) is YES, then method 100 advances to step 124, wherein processor 541 interprets the received request to determine, for example, based on information stored in memory 542 and/or contained in the received request, what engine speed needs to be set and what functions (e.g., relays, valves, pumps, clutches, etc.) need to be set in PTO device and so forth, for example, what action commands need to be sent to the engine and/or the PTO and other vehicles systems if any are involved. If other vehicle settings need to be altered, they are also conveniently also determined in step 124. Accordingly, step 124 is not intended to be limited merely to determining engine and PTO command setting but may also include other available vehicle elements that, for example, are conveniently coupled to in-vehicle communication bus 42. In subsequent step 126 the action commands necessary to achieve the settings determined in step 124 are sent, e.g., via bus 42 or the other links illustrated in FIGS. 2 and 3, to the engine and PTO and such other vehicle elements whose participation is needed according to the action request received from the WRCD or ICCD. While sending the actuation commands via bus 42 is preferred, any of the links illustrated in FIGS. 2 and 3 may be used.

In step 126, the commands selected in step 124 are sent to the engine and to PTO device 34, e.g., via link or bus 54-3, or via link 54-5 to bus 42 and via link 34-1 from bus 42 to PTO device 34, etc. After the various commands generated in steps 124 have been sent to the various parts of in-vehicle control system 40 in step 126 so as to place IVCS 40 and PTO device 34 in the desired operating condition, then in step 130, PTOCM 54 gathers information from the various elements of IVCS 40 and PTO device 34 on the operating status of the vehicle, engine, PTO device, etc., and in step 132 sends such operating status information back to the control device from which the command originated, that is, either WRCD 24 or the ICCD. Method 100 then returns to START 102 and initial query 104 as shown by path 135, 119, 105.

Figure 5:
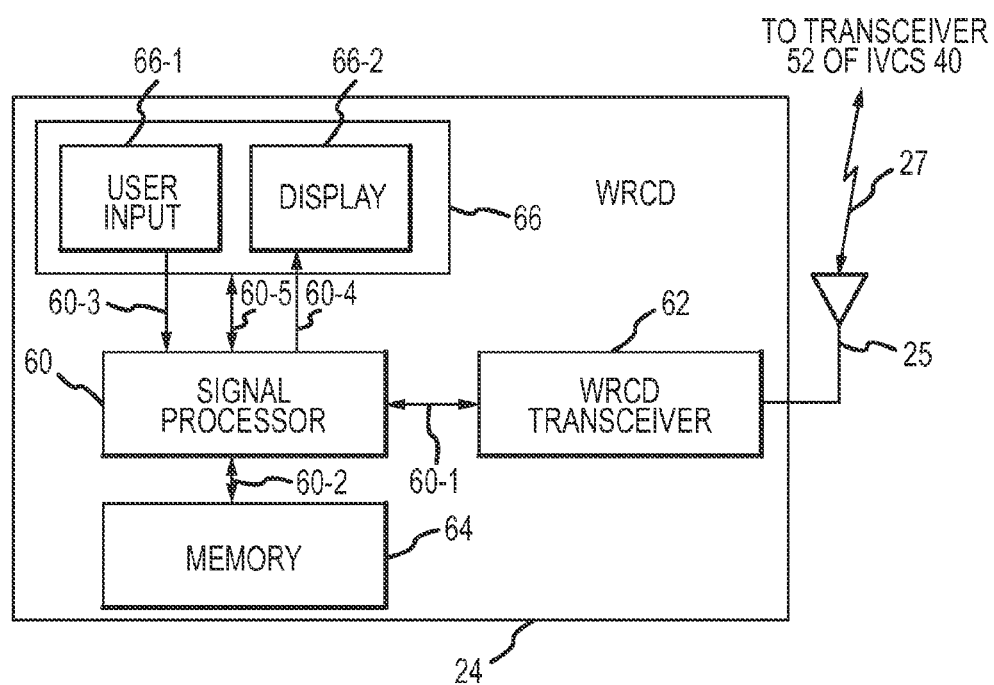
FIG. 5 is a simplified schematic block diagram of the wireless remote control device (WRCD) wirelessly coupled to the in-vehicle portion of the PTO control function of FIG. 2 according to an embodiment of the invention and showing further detail.

FIG. 5 is a simplified schematic block diagram of wireless remote control device (WRCD) 24 wirelessly coupled via antenna 25 and signals 27, 27' to in-vehicle control system 40 of the PTO control function of FIGS. 2 and 3, according to a further embodiment of the invention and showing further detail. WRCD 24 comprises signal processor 60, WRCD transceiver 62, memory 64 and operator interface 66 having therein user input 66-1 (e.g., various input switches or controls) and display 66-2. In a preferred embodiment, signal processor 60 is a microprocessor with memory 64 included therein, but that is not essential. User input 66-1 and display 66-2 may be separate elements or integrated to various degrees. For example, when a mechanical input button or switch in actuated on user input 66-1 it may light up or change color or cause a portion of display 66-2 to light up or change color so as to indicate to the user that such button or switch has been actuated. Alternatively, the input buttons, switches and/or other controls may be an integral part of display 66-2, for example, in the form of on-screen "touch buttons" or "sliders". Mechanical switches and controls are generally preferred rather than fully electronic switches integrated in the display because such mechanical switches and controls can provide tactile feedback to the user and may be more suited to the rugged working environment in which WRCD 24 is likely to be used. However, either arrangement or a combination thereof is useful. Signal processor 60 is coupled to transceiver 62 via leads or bus 60-1, to memory 64 via leads or bus 60-2, to user input 66-1 via leads or bus 60-3, and to display 66-2 via leads or bus 60-4. Alternatively, signal processor 60 may be coupled to user interface 66 incorporating user input 66-1 and display 66-2 in separate or integrated form via leads or bus 60-5. Either arrangement is useful.

Signal processor 60 receives user action requests from input 66-1, checks them for validity and formats them into a signal that will be understood by PTOCM 54 of IVCS 40 of remote controlled PTO system 22 of FIGS. 1-3 according to instructions stored in memory 64, which may be a separate element or included within a microprocessor providing the functions of signal processor 60, according to the desires of the system designer. Either arrangement is useful. Processor 60 then passes the formatted action requests to transceiver 62 which in turn adapts them for wireless transmission and sends them via antenna 25 as signal 27 destined for in-vehicle antenna 41 of transceiver 52 of IVCS 40. As explained above, IVCS 40 receives the action request signals via transceiver 52 and passes them along to PTOCM 54 where they are decoded and converted into to actuation commands to be sent to, for example, ECM 56 or engine 28, PTO device 34 and/or other elements of IVCS 40 so that desired vehicle and PTO operating conditions are obtained. IVCS 40 then desirably sends back to WRCD 24 via transceiver 52 and antennas 41, 25 signals 27' providing information to WRCD 24 on the status of PTO system 22, (e.g., was the requested action carried out and/or what is the current operating status of PTO device 34 and vehicle 20) so that this information can be sent by processor 60 to WRCD display 66-2. The operation of WRCD 24 will be more fully understood by reference to FIG. 6 and associated description below.

Figure 6:
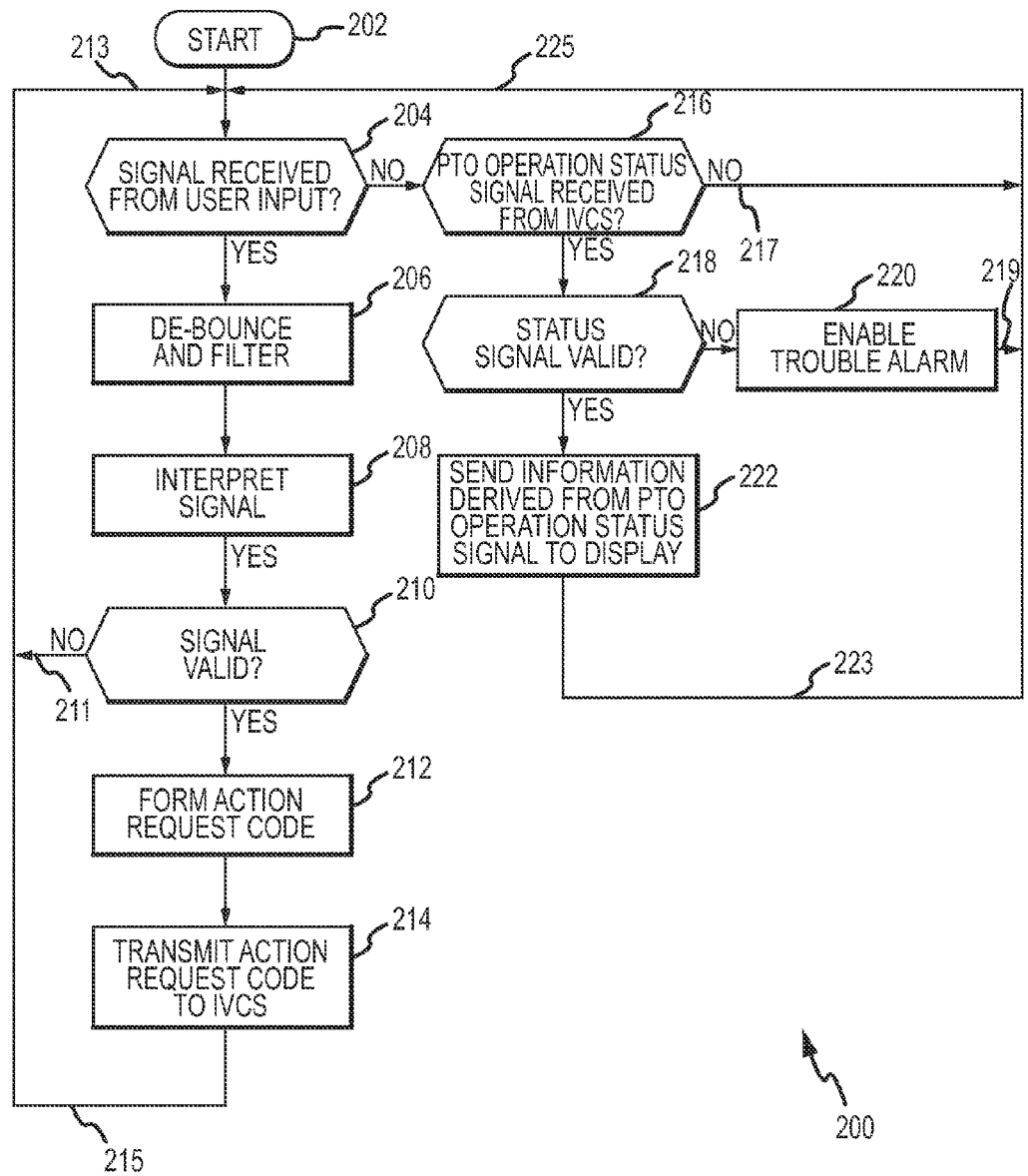
FIG. 6 is a simplified block diagram of method steps carried out by the WRCD of FIG. 4 in cooperation with the in-vehicle portion of FIGS. 2 and 3, according to a further embodiment of the present invention.

FIG. 6 shows a simplified block diagram of method 200 carried out by processor 60 of WRCD 24 of FIG. 5 in cooperation with other elements of WRCD 24 of FIG. 5 and with IVCS 40 of FIGS. 2 and 3, according to a further embodiment of the present invention. Method 200 begins with START 202 and initial SIGNAL RECEIVED FROM USER INPUT? query 204. START conveniently occurs when the vehicle or the PTO system is powered up. If the outcome of query 204 is YES, method 200 proceeds to optional DEBOUNCE AND FILTER step 206, wherein the signal from user interface 66 (e.g. via input 66-1) is conventionally processed to avoid false inputs due to switch bounce or other ambient noise. This is important since WRCD 24 will often be used in an electrically noisy environment and handled by persons wearing gloves or other protective clothing. Method 200 then proceeds to desirable INTERPRET SIGNAL step 208 wherein the received input signal is correlated with the possible outputs of the available input buttons or switches or controls so that the actual action request input is unequivocally identified. SIGNAL VALID? query 210 is then executed to determine whether the interpreted signal corresponds to an allowed action request stored in memory 64. If the outcome of query 210 is NO, then method 200 returns to START 202 and initial query 204 as shown by path 211, 213 to await receipt of another input signal. If the outcome of query 210 is YES indicating that the interpreted signal is an allowed (e.g., valid) signal, then method 200 proceeds to FORM ACTION REQUEST CODE step 212 wherein processor 60 converts the interpreted signal to the corresponding action request code that will be understood by IVCS 40. In subsequent TRANSMIT step 214 this action request code is sent via transceiver 62 to IVCS 40 and method 200 returns to START 202 as shown by path 215, 213. On completion of TRANSMIT step 214, transceiver 62 may be optionally set to receive an appropriate acknowledgement or other feedback from IVCS 40. This is desirable but not essential.

Returning now to query 204, if the outcome of query 204 is NO, then method 200 proceeds to query 216 wherein it is determined whether or not the operational status of PTO device 34 (and optionally other elements of IVCS 40) has been received from IVCS 40. If the outcome of query 216 is NO, then method 200 returns to START 202 and initial query 204 as shown by paths 217, 225. If the outcome of query 216 is YES indicating that the PTO operational status has been received by WRCD 24 from IVCS 40, then method 200 proceeds to STATUS VALID? query 218 wherein it is determined whether the operational status information received from IVCS 40 is valid, that is, corresponds to an allowed state of PTO device 34, or corresponds to some abnormal state (e.g., jammed, stopped, in-operative, failed command, etc.). If the result of query 218 is NO, indicating that the operational status information received from IVCS 40 does not correspond to any allowed or monitored condition, then method 200, according to a further embodiment, desirably proceeds to optional ENABLE TROUBLE ALARM step 220. Method 200 then returns to START 202 and initial query 204 as indicated by paths 219, 225. The trouble alarm can be any form of visible or audible output on user interface 66 (see FIG. 5) suitable for warning a user that an unusual condition or status of PTO system 22 has been detected. If the outcome of query 218 is YES indicating that the status information received from IVCS 40 is valid, then method 200 proceeds to SEND step 222, wherein operational status information concerning the PTO and any other vehicle elements that are involved, is sent to user interface 66 to alert the user to the PTO and vehicle operating status. This information may be presented on visual display 66-2 or by any other convenient means, as for example and not intended to be limiting, an audible sound pattern corresponding to the particular operating condition being reported, or a combination of audible and visual indicators. Following step 222, method 200 returns to START 202 and initial query 204 as shown by path 223, 225 to await receipt of another user command or a change in the PTO operational status and/or a change in the operating status of other involved vehicle elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for operating a power take-off (PTO) system of an engine equipped vehicle, wherein a user has access to one or more control devices for controlling the PTO system and the vehicle includes a control system for operating the PTO system, comprising:

receiving a first action request from a first control device;

receiving a second action request via a wired connection from a second control device;

determining what engine and PTO system actuation commands are associated with the first action request and whether the first action request is one of a wireless first action request and a wired first action request;

when the first action request is a wireless first action request, transmitting the actuation commands to the engine and PTO system via a data bus only if the vehicle is stationary;

when the first action request is a wired first action request, transmitting the actuation commands regardless as to whether the vehicle is stationary;

determining whether the second action request is a valid action request; and when the second action request is a valid request:

determining what engine and PTO system actuation commands are associated with the second action request;

transmitting engine and PTO system status information to the first control device and
transmitting engine and PTO system status information to the second control device.

2. The method of claim 1, further comprising ignoring the first action request if the vehicle is moving when the first action request is received wirelessly.

3. The method of claim 1, further comprising:
receiving a second action request via a wired connection from a second control device;
determining whether the second action request is a valid action request; and
when the second action request is a valid request:
determining what engine and PTO system actuation commands are associated with the second action request;
transmitting the actuation commands to the engine and PTO system via a data bus; and
transmitting engine and PTO system status information to the second control device.

4. The method of claim 3, further comprising, if the second action request is not a valid action request, ignoring the second action request.

5. The method of claim 1, further comprising, if the engine and PTO system status information indicates an abnormal condition, indicating an alarm condition to the user.

6. A system for wirelessly controlling the operation of a power take-off (PTO) of an engine equipped vehicle, comprising:
a portable remote control device (PRCD) wirelessly coupled to the vehicle and configured to receive a first user PTO action request inputs, convert those action request inputs to signals understandable by the vehicle, and wirelessly transmit the signals to the vehicle;
an in-vehicle control system wirelessly coupled to the PRCD and configured to receive the signals from the PRCD, convert the signals to engine and PTO action commands corresponding to the user PTO action request inputs, transmit, via a data bus, the action commands to the engine and PTO only when the vehicle is stationary, and report engine and PTO status information back to the PRCD, and
a wired in-cab control system configured to:
receive a second action request via a wired connection from a second control device;
determine whether the second action request is a valid action request; and
when the second action request is a valid request:
determine what engine and PTO system actuation commands are associated with the second action request;
issue PTO action commands;
transmit the actuation commands to the engine and PTO system via a data bus regardless of when the vehicle is stationary; and
transmit engine and PTO system status information to the second control device.

7. The system of claim 6, wherein the PRCD comprises:
a user interface configured to receive the PTO action request inputs from the user and present the engine and PTO status information to the user;
a processor coupled to the user interface configured to interpret the PTO action request inputs entered by the user into the user interface, convert the interpreted PTO action request inputs into action codes and convert the engine and PTO status information received from the vehicle into a form suitable for presentation to the user on the user interface; and a PRCD transceiver coupled to the processor, configured to receive the action codes from the processor, form the signals understandable by the vehicle based on the action codes and wirelessly transmit the signals to the vehicle, and wirelessly receive the engine and PTO status information from the vehicle for use by the processor and the user interface.

8. The system of claim 7, wherein the in-vehicle control system comprises:
an in-vehicle transceiver for receiving from the PRCD the wirelessly transmitted signals and extracting the action codes therefrom;
a PTO control module coupled to the engine, the PTO and the in-vehicle transceiver configured to translate the action codes into action commands understandable by the engine and the PTO, and configured to feed the status information received from the engine and the PTO back to the PRCD via the in-vehicle transceiver.

9. The system of claim 8, further comprising an engine control module coupled between the PTO control module and the engine.

10. The system of claim 9, wherein the in-vehicle transceiver, engine control module and PTO control module are coupled by a common bus.

11. The system of claim 7, wherein the user interface comprises input keys adapted to be actuated by a user to enter PTO action request inputs and a display configured to present status information to the user.

12. The system of claim 11, wherein some user input keys are touch-pads on the display.

13. The system of claim 10, wherein the common bus is an in-vehicle communication bus also coupled to other vehicle elements.

14. A method for wirelessly operating a power take-off (PTO) system of an engine equipped vehicle, wherein a user has a portable wireless remote control device (WRCD) for controlling the PTO and the vehicle has an in-vehicle control system (IVCS) wirelessly coupled to the WRCD for operating the PTO, the method comprising:
receiving a user input signal;
determining whether the user input signal has been received from a user input of the WRCD; when a user input signal has been received from the WRCD then:
testing the received user input signal for validity;
when the user input signal is valid, forming a corresponding action request code understandable to the IVCS and transmitting the action request code to the IVCS for execution thereby and,
when the user input signal is not valid, then returning to the first determining step; and
when the user input signal has been received from a user input via a wired connection from a second control device then:
determining whether the second action request is a valid action request,
when the second action request is a valid request:
determining what engine and PTO system actuation commands are associated with the second action request;
transmitting the actuation commands to the engine and PTO system via a data bus; and
transmitting engine and PTO system status information to the second control device.

15. The method of claim 14, further comprising:
when a user input signal has not been received, then determining whether a PTO operational status signal has been received from the IVCS; and when the status signal has not been received from the IVCS, then returning to the first determining step; and when the status signal has been received from the IVCS, then testing the status signal for validity.

16. The method of claim 15, further comprising:
when the status signal is not valid, then returning to the first determining step; and when the status signal is valid, then sending information derived from the status signal to a user interface of the WRCD; and then returning to the first determining step.

17. The method of claim 14, further comprising between the first determining step and the first testing step, de-bouncing and filtering the user input signal.

18. The method of claim 17, further comprising before the first testing step, interpreting the user input signal.

19. The method of claim 16, further comprising, when the status signal is not valid, enabling a trouble alarm for presentation to the user.

20. The method of claim 14, after transmitting the action request code to the IVCS, determining engine and PTO action commands based on the action request codes and sending the commands to the engine and PTO only if the vehicle is stationary.

* * * * *